United States Patent [19]

Mohr et al.

[11] Patent Number: 5,350,429
[45] Date of Patent: Sep. 27, 1994

[54] DIAMINOALKANES, THEIR PREPARATION AND FUELS AND LUBRICANTS CONTAINING THE DIAMINOALKANES

[75] Inventors: Juergen Mohr, Gruenstadt; Knut Oppenlaender, Ludwigshafen; Lothar Franz, Mutterstadt; Peter Schreyer, Weinheim; Juergen Thomas, Fussgoenheim, all of Fed. Rep. of Germany

[73] Assignee: BASF Aktiengesellschaft, Ludwigshafen, Fed. Rep. of Germany

[21] Appl. No.: 31,905

[22] Filed: Mar. 16, 1993

[30] Foreign Application Priority Data

Mar. 19, 1992 [DE] Fed. Rep. of Germany ....... 4208756

[51] Int. Cl.$^5$ ............... C10L 1/22; C07C 211/00
[52] U.S. Cl. ...................................... 44/412; 564/511
[58] Field of Search .................. 44/412; 564/503, 507, 564/511, 512

[56] References Cited

U.S. PATENT DOCUMENTS

| | | | |
|---|---|---|---|
| 3,753,670 | 8/1973 | Strang et al. | 44/72 |
| 3,950,426 | 4/1976 | Culbertson | 260/583 P |
| 4,156,061 | 5/1979 | Pappas et al. | 526/20 |
| 4,832,702 | 5/1989 | Kummer et al. | |

FOREIGN PATENT DOCUMENTS

| | | |
|---|---|---|
| 2050967 | 3/1992 | Canada . |
| 1405652 | 9/1975 | United Kingdom . |
| WO90/08787 | 1/1990 | World Int. Prop. O. . |

Primary Examiner—Prince Willis, Jr.
Assistant Examiner—Cephia D. Toomer
Attorney, Agent, or Firm—Keil & Weinkauf

[57] ABSTRACT

Fuels for internal combustion engines or lubricants contain small amounts of compounds of the formulae Ia and/or Ib

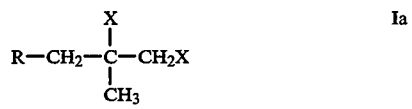

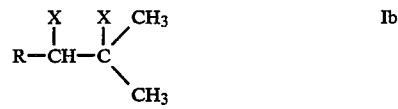

where R is an aliphatic hydrocarbon radical having a number average molecular weight of from 250 to 5,000 and X is

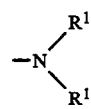

where the radicals $R^1$ may be identical or different and are each hydrogen, $C_1$–$C_{10}$-alkyl, $C_1$–$C_8$-hydroxyalkyl or $C_1$–$C_8$-aminoalkyl, or where the two radicals $R^1$ may form a nonaromatic ring.

9 Claims, No Drawings

DIAMINOALKANES, THEIR PREPARATION AND FUELS AND LUBRICANTS CONTAINING THE DIAMINOALKANES

The present invention relates to diaminoalkanes, a process for their preparation and fuels for internal combustion engines and lubricants containing small amounts of the diaminoalkanes.

Carburetors and intake systems of gasoline engines as well as injection systems for fuel metering in gasoline and diesel engines are increasingly being contaminated by impurities caused by dust particles in the air, uncombusted hydrocarbon residues in the combustion cheer and the crankcase ventilation gases passed into the carburetor.

The residues shift the air/fuel ratio during idling and in the lower load range so that the mixture becomes richer and combustion less complete and in turn amounts of uncombusted or partially combusted hydrocarbons in the exhaust gas become larger and the gasoline consumption increases.

It is known that, in order to avoid these disadvantages, fuel additives are used for keeping valves and carburetors and injection systems clean (cf. for example: M. Rossenbeck in Katalysatoren, Tenside, Mineralöladditive, Ed. J. Falbe and Hasserodt, page 223 et seq., G. Thieme Verlag, Stuttgart 1978).

However, a distinction is now made between two generations depending on the mode of action but also on the preferred site of action of such detergent additives.

The first generation of additives could only prevent the formation of deposits in the intake system but could not remove existing deposits, whereas the additives of the second generation can do both (keep-clean and clean-up effect) owing to their excellent heat stability, in particular in zones at relatively high temperatures, ie. in the intake valves.

The molecular structural principle of fuel detergents can be described generally as the linking of polar structures with generally relatively high molecular weight, nonpolar or lipophilic radicals.

Typical members of the second generation of additives are often products based on polyisobutenes in the nonpolar moiety. Here in turn, additives of the polyisobutylamine type are particularly noteworthy. Polyisobutylamines are obtained, starting from polyisobutenes, essentially by two methods. The first involves chlorination of the polymeric parent substance and subsequent nucleophilic substitution by amino or, preferably, ammonia. The disadvantage of this method is the use of chlorine and the occurrence of chlorine- or chloride-containing products, which are no longer desirable and therefore should be avoided (German Laid-Open Application DOS 2,245,918).

In the second method, a reactive polyisobutene is first carbonylated in an oxo synthesis and then subjected to hydrogenation under aminating conditions in the presence of ammonia (German Laid-Open Application DOS 3,611,230).

The previously unpublished DE-40 30 164 discloses polyisobutylaminoalcohols which are prepared from polyisobutenes by epoxidation and reaction with amines. In this preparation, the presence of water means that the formation of diols as undesirable byproducts cannot be ruled out.

Although the abovementioned fuel detergents can also have a certain dispersant effect, it is an object of the present invention to provide additives which have a particularly good dispersant effect and can be prepared without undesirable byproducts.

We have found that this object is achieved by diaminoalkanes of the general formulae Ia and Ib

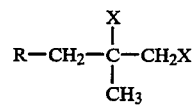

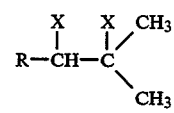

where R is an aliphatic hydrocarbon radical having alkyl side groups and a number average molecular weight of from 250 to 5,000 and X is

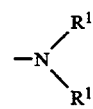

where the radicals $R^1$ may be identical or different and are each hydrogen, $C_1$-$C_{10}$-alkyl, $C_1$-$C_8$-hydroxyalkyl or $C_1$-$C_8$-aminoalkyl, or where the two radicals $R^1$ may form a nonaromatic ring.

Among these compounds, preferred ones are those in which R is a polybutyl or polyisobutyl radical derived from isobutene and from 0 to 30% by weight of n-butene and/or those in which both radicals $R^1$ independently of another are hydrogen or $C_1$-$C_3$-alkyl.

The alkyl side groups in R are preferably branched or straight-chain alkyl of 1 to 30, in particular 1 to 4, carbon atoms.

We have found that this object is furthermore achieved by fuels or lubricants which contain the novel diaminoalkanes in amounts effective as dispersants and detergents.

The novel diaminoalkanes are added to the fuels in amounts of from 50 to 5,000 ppm, preferably from 100 to 2,000 ppm, and to the lubricating oils in amounts of from 0.5 to 10, preferably from 1 to 5, % by weight, based on the lubricating oil.

The novel additives are used in fuels preferably together with conventional polyisobutylamines of the formula

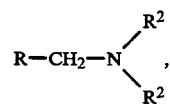

where R is a polybutyl or polyisobutyl radical derived from isobutene and from 0 to 30% by weight of n-butene and $R^2$ is hydrogen, $C_1$-$C_{10}$-alkyl or $C_1$-$C_8$-aminoalkyl which may be substituted by further amino-carrying $C_1$-$C_6$-alkyl radicals, in order to achieve both a very good detergent effect and a very good dispersant effect.

The novel diaminoalkanes are advantageously obtained by epoxidation of the corresponding polyalkylenes and subsequent nucleophilic epoxide cleavage with ammonia or an amine, in conjunction with an addition reaction of ammonia or an amine in the form of a reductive amination.

For this purpose, a reactive polyalkylene, eg. polyisobutene, is first converted by means of a known epoxidation reagent and, if required, a catalyst (peracetic acid, m-chloroperbenzoic acid, hydroperoxides and similar reagents) into the corresponding epoxide (cf. for example: G. Dittius in Houben-Weyl, Vol. 6/3, 4th Edition, page 385 et seq., G. Thieme Verlag Stuttgart 1965, or D. Swern, Org. React. VII. (1953), 378 et seq.). These epoxides are then converted into the diaminoalkanes by reaction with $NH_3$ and/or corresponding amines under the conditions of reductive amination.

The reactive polyalkylenes used are prepared by polymerization of straight-chain or branched $C_2$–$C_{30}$-olefins, preferably $C_2$–$C_6$-olefins, in particular $C_2$–$C_4$-olefins, the polymerization being carried out so that the chain termination leads to a double bond (for example by cationic or coordinative polymerization).

The polyalkylenes may be homopolymers or copolymers. Ethylene is used only for the preparation of copolymers in order to ensure sufficient fuel solubility of the diaminoalkanes finally obtained.

Preferably used olefins are 1-alkenes, in particular propylene, 1-butene, isobutene or mixtures of these olefins.

The polyalkylenes used have an average molecular weight of from 250 to 5,000, preferably from 800 to 1,500. They are obtained by known processes, by cationic polymerization, for example, of isobutene, a double bond remaining in the finally incorporated monomer after termination of the polymer chain (cf. for example: German Laid-Open Application DOS 2,702,604 and EP-A 0 145 235).

This double bond is epoxidized by conventional methods. Epoxidation of the polyisobutene, for example by means of m-chloroperbenzoic acid, is described by J.P. Kennedy et al., J. Polym. Sci.: Polym. Chem. Ed., 20 (1982), 2809–2817.

Very high yields of epoxide are also obtained by reacting the polyalkylene with a hydroperoxide, eg. tert-butyl hydroperoxide, in the presence of a transition metal catalyst (a molybdenum tungsten salt or complex) in a solvent which is inert under the reaction conditions or in the absence of a solvent.

The epoxides obtained by the abovementioned processes are converted into the diamines under the conventional conditions of reductive amination. The amination reaction is advantageously carried out at from 80° to 200° C. and under hydrogen pressures of up to 600, preferably from 80 to 300, bar, in the presence of conventional hydrogenation catalysts, eg. Raney nickel or Raney cobalt.

$NH_3$ is particularly preferably used for the amination.

In the preferred reaction with $NH_3$, aminohydroxyalkanes, ie. compounds of the general formulae Ia and Ib, in which one radical X is OH and the other radical X is $NH_2$, can also form and can be isolated if, for example, the reaction temperature is reduced and/or the reaction time is shortened.

It is also possible first to hydrolyze the epoxides to the corresponding diols, for example under acid catalysis, to isolate the diol and then to convert it into the novel diamines, likewise under the conditions of reductive amination. Here too, amino alcohols may occur as intermediates.

Starting from the corresponding epoxides, diaminoalkanes which have physical properties similar to those of the starting compounds are thus obtained. In addition to the activity as detergents and dispersants in the intake system, the reaction products with $NH_3$ and/or amines, to be added according to the invention, also have dispersing properties in the engine oil, which can be demonstrated by chromatographic tests, whereas, for example, the known polyisobutylamines are at best neutral with respect to oil sludge.

Testing of the products as fuel additives, particularly with regard to their suitability as valve and carburetor cleaners, is effected with the aid of engine tests which are carried out in test bays using a 1.2 l Opel Kadett engine according to CEC-F-02-T-79.

The amine number for characterizing the diaminoalkanes or the corresponding amino alcohols was determined according to DIN 16,945 and the hydroxyl number according to DIN 53,240.

EXAMPLES

1. Epoxidation of polyisobutene

A solution of 100 g of a reactive polyisobutene having a molecular weight $M_n$ of 950 (prepared according to German Laid-Open Application DOS 2,702,604), 81 g of tert-butyl hydroperoxide/tert-butanol (1:1) and 0.7 g of molybdenum ethylhexanoate in cyclohexanol (Mo content 6.6%) is heated at 80° C. for one hour and then at 90° C. for 2 hours. The two phases are separated from one another after cooling and the polyisobutene phase is washed, if necessary, with water and dilute sodium bicarbonate solution.

Volatile components and low boilers are then removed at 80° C. under reduced pressure from a water pump.

102.6 g of an oily residue remain, said residue containing over 95% of epoxide after volumetric titration (Analyt. Chem. 36 (1964), 667). The formation of the epoxide can be monitored by $^1H$- and $^{13}C$—NMR spectroscopy.

2. Reaction of the epoxide with ammonia a) 150 g of the epoxide are dissolved in 300 g of cyclohexane, and 20 g of Raney nickel are added. 500 ml of ammonia are added to the solution in an autoclave and the mixture is heated at 210° C. for 3 hours at a hydrogen pressure of 250 bar. The readily volatile components are stripped off under reduced pressure in a rotary evaporator. The amine number of the product is 10.2 and the hydroxyl number is 11.8. This gives a degree of amination of 46%, ie. an amino alcohol is present.

b) 150 g of the epoxide are dissolved in 300 g of cyclohexane, and 20 g of Raney nickel are added. 1,000 ml of ammonia are added to the solution in an autoclave and the mixture is heated at 220° C. for 8 hours at a hydrogen pressure of 280 bar. The readily volatile components are stripped off under reduced pressure in a rotary evaporator. The amine number of the product is 21.9 and the hydroxyl number is 1.7. This gives a degree of amination of 93%, ie. the polyisobutyldiamine is obtained virtually quantitatively.

3. Results of engine tests, test as valve cleaner in a 1.2 l Opel Kadett engine

|  | Deposit [mg]* Valve No. | | | |
| --- | --- | --- | --- | --- |
|  | 1 | 2 | 3 | 4 |
| Base value | 368 | 467 | 314 | 583 |

| | Deposit [mg]* Valve No. | | | |
|---|---|---|---|---|
| | 1 | 2 | 3 | 4 |
| Reaction product from Example 2b) | 0 | 0 | 0 | 1 |

*According to CEC-F-02-T-79

We claim:

1. A fuel for an internal combustion engine comprising small amounts effective as dispersant and detergent of compounds of the formulae Ia or Ib

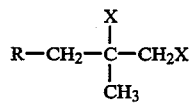   Ia

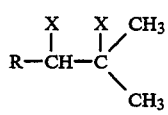   Ib where R is an aliphatic hydrocarbon radical having alkyl side groups and a number average molecular weight of from 250 to 5,000 and X is

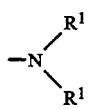

where the radicals $R^1$ may be identical or different and are each hydrogen, $C_1$–$C_{10}$-alkyl, $C_1$–$C_8$-hydroxyalkyl or $C_1$–$C_8$-aminoalkyl.

2. A fuel as claimed in claim 1, wherein R is a polybutyl or polyisobutyl radical derived from isobutene and from 0 to 30% by weight of n-butene.

3. A fuel as claimed in claim 1, wherein $R^1$ is hydrogen.

4. A fuel as claimed in claim 1, which contains from 50 to 5,000 ppm of compounds of the formulae Ia or Ib.

5. A fuel as claimed in claim 1, which contains, in addition to the compounds of the formula I, a fuel detergent of the formula

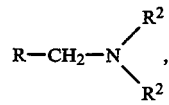

where R has the meanings stated in claim 2 and $R^2$ is hydrogen or $C_1$–$C_{10}$-alkyl or $C_1$–$C_8$-aminoalkyl which may be substituted by further amino-carrying $C_1$–$C_6$-alkyl radicals.

6. A diaminoalkane of the formula Ia or Ib

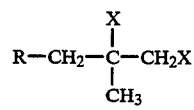   Ia

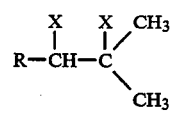   Ib where R is an aliphatic hydrocarbon radical having alkyl side groups and a number average molecular weight of from 250 to 5,000 and X is

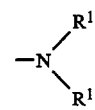

where the radicals $R^1$ may be identical or different and are each hydrogen, $C_1$–$C_{10}$-alkyl, $C_1$–$C_8$-hydroxyalkyl or $C_1$–$C_8$-aminoalkyl.

7. A diaminoalkane as claimed in claim 6, wherein R is a polybutyl or polyisobutyl radical derived from isobutene and from 0 to 30% by weight of n-butene.

8. A diaminoalkane as claimed in claim 7, wherein $R^1$ is hydrogen.

9. A process for the preparation of a diaminoalkane as claimed in claim 6, comprising
a) converting a polyalkene by means of a conventional epoxidation reagent with or without a catalyst, into the corresponding epoxide and converting the obtained epoxide into the diaminoalkane by reaction with ammonia or an amine under the conditions of reductive amination.

* * * * *